June 11, 1940.  R. H. PRATT  2,204,149
PERMANENT COTTON BALE IDENTIFYING MEANS
Filed Aug. 6, 1938
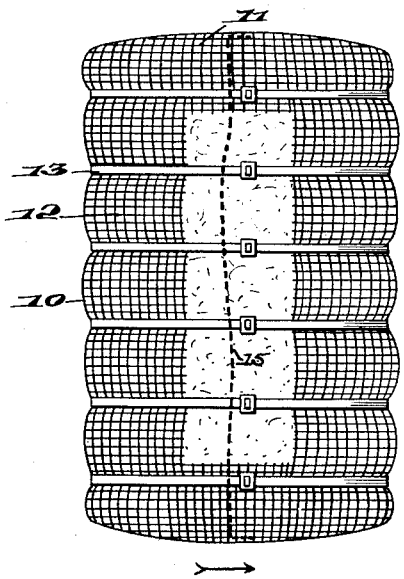
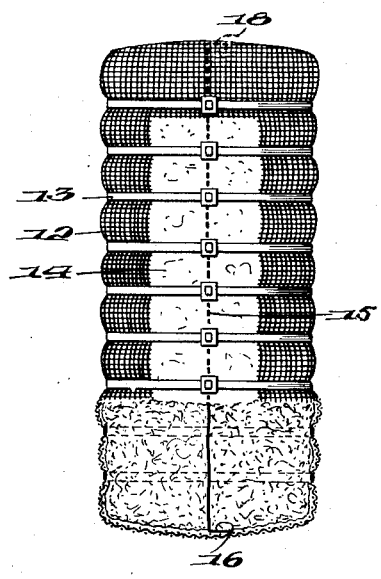
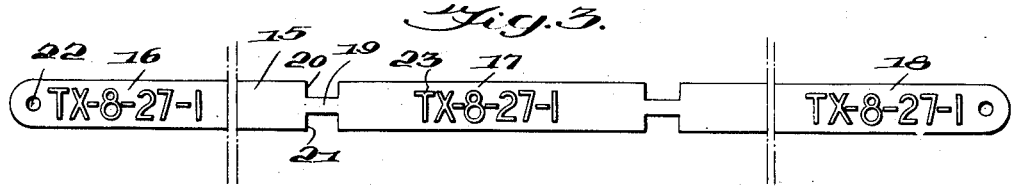
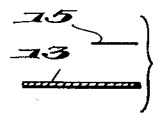
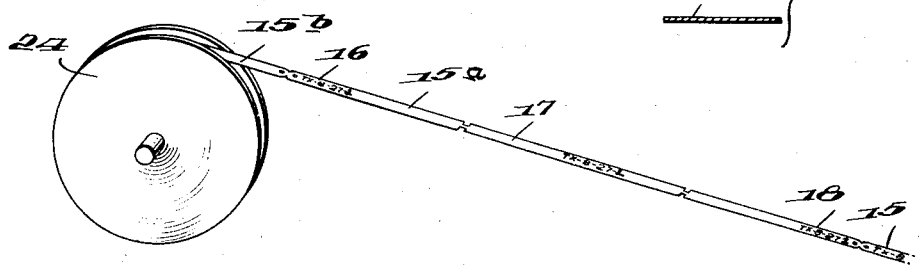
Inventor
R. H. Pratt,
By Edmund H. Parry Jr.
Attorney Patented June 11, 1940

2,204,149

UNITED STATES PATENT OFFICE 2,204,149

PERMANENT COTTON BALE IDENTIFYING MEANS

Richard H. Pratt, Mobile, Ala.

Application August 6, 1938, Serial No. 223,540

6 Claims. (Cl. 40—20)

This invention relates to the marking of bales of cotton or other fibrous material for identification purposes. The essential object of the invention is to provide a marker of such form and so associated with the bale as to provide a permanent identification for a bale under all conditions, normal or abnormal, to which a bale may be subjected, and which will endure even though the bale be partially or wholly destroyed by fire, or subjected to water or other deteriorating influences.

I am aware that various expedients have heretofore been suggested for permanently identifying fibrous material packed in bales, but so far as I am aware no one has heretofore proposed any identifying means which satisfactorily answers all essential requirements with reference to permanency, installation, proofness against surreptitious removal or substitution, insurance against injury to bale handlers, and ability to withstand the recompression of a gin bale into a high density bale without danger of loss or injury to the marker and without danger of injury to machinery.

The present invention has been developed after long study of the problem of identifying bales, and it can be stated with assurance that the same answers each and all of the requirements above enumerated, and includes not only a marker of special form and characteristics, but a special arrangement of the marker in its association with the bale.

The form, characteristics and manner of installing the marker will be understood by reference to the following detailed explanation of the illustrative embodiment illustrated in the accompanying drawing.

In such drawing:

Fig. 1 is a plan view of a gin bale of cotton with the inventive marker installed therein;

Fig. 2 is a similar view of a high density bale, certain portions being broken away to more clearly show the arrangement of the marker;

Fig. 3 is a plan view approximately to scale of the preferred form of marker;

Fig. 4 is an explanatory view giving a comparison between the cross-section of the marker and a standard metal tie band such as encircles a bale; and, Fig. 5 is a perspective view on a much reduced scale indicating the manner in which a series of markers are packaged for distribution, the arrangement being such that individual markers may be successively removed for installation in different bales.

The showing in Fig. 1 represents a standard rectangular cotton bale which in practice has a length (the greatest dimension) of approximately 56 inches. As is usual the long sides 10 are protected in part by a web covering 12, the latter also extending around and completely covering the opposite heads or ends 11 of the bale. As conventionally a series of six tie bands 13 encircle sides 10 of the bale in a transverse direction at right angles to its long axis.

As will be understood by those skilled in the art the gin bale shown in Fig. 1 is formed in a press box (not shown) having an open upper end through which the gin cotton is fed, and in which reciprocates a tramper. In the press box the long slide 10 of the bale, which in Fig. 1 is at the left and extends vertically, would be at the bottom of the box and extends horizontally. The long side at the right end of the figure would be at the top of the press box. The building up of cotton in the press box in the formation of the bale takes place in the direction of the arrow indicated at the bottom of the figure. The web covering usually comprises two sections which are applied to the bottom and top sides while the bale is in the press. After the press box has been filled and the bottom press member moved upwardly the tie bands 13 are secured, the same extending vertically while the bale is in the press box. This reference to the baling operation is here made since the inventive marker is installed during the course thereof as hereafter explained.

The bale 14 shown in Fig. 2 is a high density bale which is formed from a gin bale such as shown in Fig. 1 by removing the tie bands and subjecting the bale with the covering still thereon to high compression. The recompression operation results in a substantial decrease in the widthwise dimension and the bale assumes the form shown in Fig. 2. In view of the change in size of the bale a new series of shorter bands 13, usually nine, is applied to the high density bale. The band metal is usually strip iron about ⅞ of an inch wide and .040 inch thick. The weight of the six bands of the gin bale runs about nine pounds and therefore constitutes an appreciable factor in the total weight of the bale. Since the bale weight is determined at the time the original bale leaves the gin press substantially the same amount of band metal will be employed in banding the recompressed high density bale so the weight thereof will correspond to the measured weight of the gin bale.

The bale marker 15, as shown in Fig. 3, comprises a light, thin and flexible continuous length of ductile metallic ribbon. It must not be heavy metal banding. The ribbon is of such character that it may be easily rolled and unrolled and bent so as to facilitate handling and installation. Further it is highly resistant to heat and fire, non-oxidizing, and spark emission-proof. In this connection it may be stated that in case of a fire a cotton bale burns with a very intense heat with the result that the iron tie bands flake, oxidize and in part burn away, or at least seriously deteriorate. For this reason and because also of its considerable weight tie band metal which is used for the bands 13 as shown in Figs. 1 and 2 is totally unsuited for the marker. It might be further added that tie band metal is also unsuitable for my purpose because of the weight and thickness thereof, and the difficulty of handling the same.

For my purpose I find that metal foil having a thickness of .005 inch is particularly suitable, although the thickness may be .008 inch. The thickness probably should not be over .010 inch in order to attain the desired flexibility and ease of handling the marker. So that the marker be not only extremely thin and light in weight, but at the same time though, ductile, completely proof against deterioration in case of fire at the temperatures under which a bale burns, and also proof against the emission of spark on contact with other metal and therefore devoid of any fire hazard, I use metal in ribbon form such as employed in various types of electrical resistance and heater coils, and composed of an alloy of nickel, chromium and steel.

The ribbon as indicated will be thin and rather narrow, preferably being .005 inch in thickness and approximately ⅜ of an inch wide. As will be understood from Fig. 4 the cross sectional dimensions of the ribbon are negligible compared with those of the tie band iron 13. The alloy referred to is also comparatively light. For reasons which will hereafter appear the marker will comprise a length of ribbon approximately six feet long. The total weight thereof will be only about .036 pound which is substantially negligible, or at least too small to be taken account of in determining the actual weight of cotton in the bale, and this is an important factor since the cost of a bale of cotton or other fibrous material of any given quality is reckoned on the total bale weight.

The marker 15 is incorporated as a component part of the bale as will be understood from Figs. 1 and 2. As shown in Fig. 3 the marker has opposite end portions 16 and 18 and a central portion 17 integral with the end portions. Before application the marker is in the form of a continuous flat strip of ribbon of the character indicated, and the same will be embossed adjacent the extremities of the opposite ends 16 and 18, and at one or more points of its central portion 17 with similar identifying indicia 23 to indicate such data as state and season of growth, serial number of bale, permit number of the gin where the bale was made, and/or other information which might be considered desirable.

The marker 15 will be installed in a gin bale during the course of formation. After the press box has been filled approximately half way in the direction of the arrow as shown in Fig. 1 the marker, which as indicated will be approximately six feet long, will be laid horizontally across the open end of the press box so as to be caught by the tamper and pressed downwardly. The remainder of the cotton will then be inserted to fill the press box and the baling operation completed in the usual manner. Because of the light flexible character of the metal and the non-sparking character thereof, there is no danger that the marker will injure the pressing machinery or create a spark which might set the cotton on fire. As will be understood from Fig. 1 the marker 15 is inserted so as to extend in the direction of the longest dimension of the press box, and the correspondingly longest dimension of the completed bale.

This arrangement is important for several reasons. In the first place, the arrangement is such that the marker ribbon will not be mutilated by the tamper or press member during formation and compression of the bale. In the second place, the arrangement is such that, as best shown in Fig. 2, the ends 16 and 18 of the marker can be bent down over the lint cotton at the opposite heads of the bale so that they will underlie and be protected by the bale covering 12. The end portions of the marker are therefore not likely to be injured during the course of handling of the bale. Again, even though the ribbon is inherently of such character as to be "spider-proof" the insertion of the marker ends under the covering completely insures against danger of injury to the hands of a person handling or opening the bale. It will be understood, that while the marker ends are thus protected they are readily accessible so that the identifying indicia thereon can be read merely by opening up a small portion of the covering at one or the other heads.

The bale marker as descried cannot be readily removed from the bale. Because of its substantial length (extending as it does through the longest dimension of the bale) it cannot be removed until the bale ties are broken. Even if both ends 16 and 18 with their identifying indicia are intentionally or surreptitiously removed there will always remain a portion of the marker interiorally of the bale bearing corresponding identifying indicia.

To further insure against removal of the marker, and indicate when attempts have been made to remove the same, a frangible connection may be employed at intermediate parts of the marker. As shown in Fig. 3 such connection may be provided by mutilating the ribbon by oppositely extending notches 20 and 21 to provide a central portion 19 of substantially reduced width. The latter portion will be of sufficient strength to resist all ordinary handling, but under considerable longitudinal pull exerted in an attempt to remove the marker from the bale will rupture, thus allowing only a portion of the marker at one end to be pulled away, and leaving the remaining portion interiorally of the bale where it is inaccessible until the bale is opened. The notches 20 and 21 will preferably be of rectangular form and somewhat longer in a lengthwise direction than widthwise so that the cotton may pack in the notches and provide anchorage against longitudinal movement of the marker. This will further serve to make the frangible connection operative. Similar connections of the type referred to will be disposed between each end portions 16 and 18 and the central portion 17 so that the central portion cannot possibly be removed from the bale.

Adjacent the opposite end extremities holes 22 may be provided to facilitate handling of the marker both before and during its application to the press box. The similar indicia which is embossed at repeated points of the marker is designated 23.

Because of the length of the individual markers, to facilitate handling thereof it is preferred to manufacture them as a single strip series 15, 15a, 15b, etc., wound on a reel 24, all as shown in Fig. 5. Each successive marker on the reel will bear a higher serial number so that the marker of the first bale will be numbered "1", the next marker for the next bale "2", and so on. Notches may be provided between the end extremities of the successive markers so that one marker may be wound off and readily cut apart for the next marker either before or after it has been laid across the press box. Because of the thinness of the metal ribbon, the severing of adjacent markers may be accomplished without difficulty. The thinness of the marker also facilitates the formation of clear permanent embossed indicia on the ribbon.

It will be understood from the description here given that the marker of the invention is extremely simple, and of such light weight as not to be a perceptible factor in the weight of a bale. Despite the fact that the metal employed has the various desirable characteristics above stated the cost of the same for each bale is quite low. The marker will be installed during the formation of the gin bale, and because of its form and arrangement will not interfere with, or be injured by the recompression of a gin bale into a high density bale. It is also so light and flexible that it may be handled with a great ease during the course of insertion, and because of its character and arrangement in the bale does not constitute a hazard to a person handling the bale in shipment or during opening. For these and other reasons it is believed that the present marker satisfies all requirements for a permanent identification device for bales of fibrous material and constitutes a distinct improvement over such devices as heretofore proposed.

Since tests show that a bale of cotton burns at a relatively high temperature which comes up to somewhat over 2000° F., the problem of providing a marker which would preserve bale-identifying information has been a serious one. There are, of course, many metals which will not melt at the temperature of a burning bale. Nevertheless, the majority of metals seriously scale, oxidize and break at the temperatures to which a bale marker is exposed when the bale is on fire with the result that the identification would be lost. Furthermore, it has heretofore been supposed necessary to make a bale marker of relatively heavy gauge metal in order to be sufficiently fire-resistant under the conditions mentioned, and of course an objectionable weight factor is obtained in the case of a thick marker, particularly where as in the arrangement of the present invention the marker is a number of feet long.

Considering the circumstances just mentioned it will be evident that the inventive marker possesses extremely surprising and very desirable characteristics. Despite its length it is of negligible weight. It is virtually heat and fire proof, not only in the sense that it will not melt at the temperature of a burning cotton bale, but because it will not scale, or oxidize (except to the extent of turning from its natural silver color to burnished blue and brown). Despite the fact that it has these unusual fire-resisting characteristics it is composed not of a heavy gauge metal, as might be supposed to be necessary, but of extremely thin gauge metal which can be classed as a foil and which is of negligible weight. These various characteristics are all mutually important in securing permanent identification for bales of fibrous material, and enable me to provide a marker which is proof against removal from a bale, which provides permanently preserved duplicate indicia at the surface and interiorally of a bale, and which is of such design and so arranged that it can be conveniently installed in the bale and will never be a hazard to machinery or handlers.

I claim:

1. A permanent identifying marker for insertion in a bale of fibrous material consisting of a thin and narrow piece of metal ribbon somewhat longer than the longest dimension of the bale in which it is to be employed so that it may be inserted in the bale to extend the whole length of the bale with an end portion of the ribbon projecting from at least one end of the bale, said marker ribbon being embossed with duplicate identifying symbols adjacent at least one or more intermediate points removed from the opposite end extremities thereof, said ribbon being flexible and ductile, so as to avoid injury to baling machinery and handlers and accommodate the ribbon to distortion of the bale material resulting from pressing and baling, and being highly fire-resistant, said ribbon being composed of a strong but readily bendable nickel-chrome alloy foil not more than .01 inch thick capable of withstanding temperatures up to 2,000 degrees F. without destruction or appreciable oxidation, and a frangible indented portion in the ribbon between the symbol points sufficiently weak in relation to the cross-section dimension of the ribbon as to break under lengthwise tension on the ribbon and thereby prevent removal of more than a fragmentary portion of the marker from a bale.

2. A marker for bales of fibrous material consisting of a long continuous piece of fire resistant thin light gauge metal ribbon having a thickness not exceeding .01 inch adapted to be inserted in a bale with at least one end portion protruding from a face of the bale, said length of ribbon forming a single bale marker, duplicate bale-identifying symbols embossed at repeated points along the length of the ribbon, and a frangible connection in said ribbon between the symbol points sufficiently weak in relation to the cross-section dimension of the ribbon as to break under lengthwise tension on the ribbon to prevent removal of more than a fragmentary portion of the marker from a bale.

3. A marker for bales of fibrous material consisting of a long continuous piece of thin metal ribbon adapted to be embedded in a bale with at least one end portion protruding from a face of the bale, duplicate bale-identifying symbols embossed at repeated points along the ribbon including a point adjacent one end and at least one intermediate point removed from both ends, said piece of ribbon forming a single bale marker and having a reduced portion between the symbol points, said reduced portion comprising a central portion of the ribbon defined by opposite substantially rectangular notches extending inwardly from the opposite side edges of the ribbon, and said notches being of greater dimension lengthwise of the ribbon than crosswise thereof.

4. In combination with a bale of fibrous material having a series of transversely extending tie bands encircling the same, a permament bale marker comprising a length of metal ribbon extending lengthwise of the bale and surrounded by the tie bands so as to be held against removal by the compression exerted by the tie bands, said ribbon being longer than the lengthwise dimension of the bale and having end portions projecting from the opposite ends of the bale, duplicate bale-identifying symbols embossed on at least one of the projecting end portions of the ribbon and at one or more intermediate portions thereof, said ribbon being ductile and readily bendable so as to accommodate itself to distortion of the bale material caused by pressing and application of the tie bands, and being composed of a narrow foil of a metal alloy resistant to deterioration under temperature up to 2,000 degrees F.

5. In combination with a bale of fibrous material, a marker comprising a length of fire resistant thin light-gauge metal ribbon having a thickness not exceeding .01 inch inserted in the bale and having at least one end portion projecting from one face of the bale, duplicate bale-identifying symbols embossed on said end portion and on an intermediate portion of the ribbon located within the confines of the bale, and a frangible portion in the ribbon at a point between the symbol-bearing projecting end portion and the symbol-bearing intermediate portion sufficiently weak in relation to its thickness and width as to break under lengthwise pull exerted on said projecting end portion.

6. A metallic bale marker strip for severance into individual strip-type markers for use in bales of fibrous material comprising a long length of strip of flexible and ductile thin metal ribbon provided with a series of similar indentations spaced apart a distance greater than bale length and defining transverse lines of weakness between the ends of the different marker sections for ready division of the strip into individual markers, duplicate bale-identifying symbols embossed in the strip at repeated points between the indentations defining the opposite ends of each marker section, and further indentations in the strip intermediate said end-defining indentations located between the duplicate symbols of each marker section, said further indentations being visually and structurally different from the end-defining indentations and providing frangible points in the individual markers adapted to break under lengthwise pull when the markers are incorporated in bales and prevent removal from a bale of at least one fragmentary portion of a marker containing a bale-identifying symbol.

RICHARD H. PRATT.